United States Patent [19]

Yamada

[11] Patent Number: 4,706,129

[45] Date of Patent: Nov. 10, 1987

[54] IMAGE SCANNING APPARATUS

[75] Inventor: Junichi Yamada, Kaisei, Japan

[73] Assignee: Fuji Photo Film Co., Ltd., Minami-ashigara, Japan

[21] Appl. No.: 671,778

[22] Filed: Nov. 15, 1984

[30] Foreign Application Priority Data

Nov. 17, 1983 [JP] Japan ................. 58-216846

[51] Int. Cl.$^4$ ............... H04N 3/02; H04N 1/04; H04N 1/10
[52] U.S. Cl. ................... 358/293; 358/199; 358/285; 358/901; 346/139 A; 310/135
[58] Field of Search ........... 358/293, 294, 285, 199, 358/203, 901; 364/414; 346/139 A; 318/135, 687

[56] References Cited

U.S. PATENT DOCUMENTS

| 3,166,752 | 1/1965 | Waterman | 346/139 A |
| 3,956,587 | 5/1976 | Nelson | 358/901 |
| 4,368,413 | 1/1983 | Tazaki | 318/135 |
| 4,387,428 | 6/1983 | Ishida et al. | 364/414 |

FOREIGN PATENT DOCUMENTS 56-11395 2/1981 Japan .

Primary Examiner—James J. Groody
Assistant Examiner—John K. Peng
Attorney, Agent, or Firm—Fleit, Jacobson, Cohn & Price

[57] ABSTRACT

An image scanning apparatus comprises a recording material supporting member for supporting a recording material in a straightly moveable manner, and an endlessly moveable member positioned close to the recording material supported on the supporting member for movement along straight lines parallel to the recording material at an angle with respect to the movement direction of the recording material. The recording material supporting member is moved at a velocity approximately equal to the velocity component of the endlessly moveable member in the movement direction of the recording material so that the recording material is two-dimensionally scanned by light. The endlessly moveable member is provided with a photodetector and/or a light source. When the apparatus is used for image read-out, the endlessly moveable member is provided with a single light source and a plurality of light receiving elements positioned around the light source.

4 Claims, 4 Drawing Figures

IMAGE SCANNING APPARATUS

BACKGROUND OF THE INVENTION

1. Field of the Invention

This invention relates to an image scanning apparatus for two-dimensionally scanning an image recording material by a light beam. This invention particularly relates to an image scanning apparatus wherein scanning in the main scanning direction is conducted by moving a light detecting means and/or a light emitting means supported on an endless moveable member and scanning in the sub-scanning direction is conducted by moving the recording material.

2. Description of the Prior Art

An image scanning method for recording an image on a recording material or for reading out an image therefrom by two-dimensionally scanning the recording material by a light beam is widely used in facsimile devices and the like. In the method, two-dimensional scanning is conducted by deflecting a light beam by a light deflector in one direction (main scanning direction) to form a scanning line on the recording material and by mechanically moving the recording material in a direction (sub-scanning direction) normal to the main scanning direction, thereby forming many scanning lines in parallel with each other.

In the apparatus for carrying out image scanning, since the light deflector is positioned far away from the recording material for deflection of the light beam, the apparatus naturally becomes large. When image readout is conducted by use of a light beam, in order to prevent attenuation of light reflected by the recording material or light emitted by a stimulable phosphor sheet upon stimulation thereof in the case where the stimulable phosphor sheet as described, for example, in U.S. Pat. No. 4,387,428 and Japanese Unexamined Patent Publication No. 56 (1981)-11395 is used as the recording material, a sheet-like light guide member is positioned close to the recording material. Also in this case, the apparatus becomes large since the light guide member has to have a large size and a complicated shape for guiding light entering from a long linear light input face thereof up to a small photodetector. Further, when the light guide member is of a complicated shape, the distance from the light input face thereof to the photodetector becomes nonuniform, and nonuniformity of light detection sensitivity arises.

SUMMARY OF THE INVENTION

The primary object of the present invention is to provide an image scanning apparatus which is small and free from nonuniformity of light detection sensitivity.

Another object of the present invention is to provide an image scanning apparatus which exhibits markedly improved light detection sensitivity.

In the image scanning apparatus of the present invention, scanning in the sub-scanning direction is conducted by moving a recording material in the same way as in most conventional image scanning apparatuses, but scanning in the main scanning direction is carried out without using a light deflector. In the present invention, scanning in the main scanning direction is carried out by mounting a light detecting means and/or a light emitting means on an endlessly moveable member and driving the endlessly moveable member to linearly move the light detecting means and/or the light emitting means above the recording material. In order to conduct scanning in the main scanning direction and in the sub-scanning direction approximately normal to each other, a linear movement path of the endlessly moveable member is positioned at an oblique angle with respect to the sub-scanning direction, and the recording material feed speed by a means for feeding the recording material in the sub-scanning direction is adjusted approximately equal to the speed component of the endlessly moveable member in the sub-scanning direction.

Since the light detecting means and/or the light emitting means can be positioned close to the recording material, it is possible to fabricate the image scanning apparatus of the present invention in a very small size. Further, the image scanning apparatus of the present invention is free from nonuniformity of light detection sensitivity caused by nonuniformity in light path length between the recording material and the light detecting means. Also, it becomes possible to markedly improve the light detection sensitivity.

DESCRIPTION OF THE PREFERRED EMBODIMENTS

The present invention will hereinbelow be described in further detail with reference to the accompanying drawings.

Figure 1:
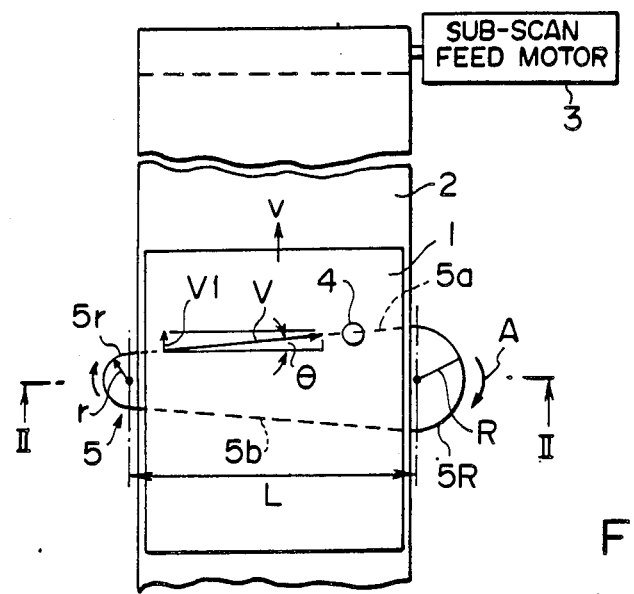
FIG. 1 is a schematic plan view showing an embodiment of the image scanning apparatus in accordance with the present invention.
Figure 2:
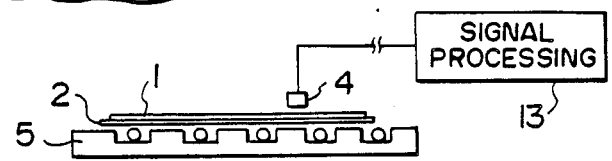
FIG. 2 is a sectional view taken along line II-II of FIG. 1.

FIGS. 1 and 2 show an embodiment of the image scanning apparatus in accordance with the present invention. By way of example, this embodiment is fabricated so that a stimulable phosphor sheet carrying a radiation image stored therein is exposed to stimulating rays which cause it to emit light in proportion to the radiation energy stored, and the emitted light is detected. A stimulable phosphor sheet 1 used as a recording material is supported on a sheet supporting means 2 constituted, for example, by an endless belt. The sheet supporting means 2 is moved by a sub-scanning feed motor 3, and the stimulable phosphor sheet 1 is thereby moved upwardly in FIG. 1 (i.e. in the sub-scanning direction) at a velocity v. A rotation path member 5 for defining a rotation path for a moveable member 4 is positioned so that the rotation path defined thereby encircles a line normal to the movement direction of the sheet supporting means 2. The rotation path member 5 and the moveable member 4 respectively constitute a primary iron core and a secondary conductor plate of a linear induction motor with the stimulable phosphor sheet 1 intervening therebetween. The moveable member 4 rotates endlessly in a plane parallel and close to the stimulable phosphor sheet 1. The rotation path member 5 is constituted of semicircular portions 5r and 5R, which respectively have radii r and R and are spaced apart by a distance L along the center line, and straight line portions 5a and 5b connecting the semicircular portions 5r and 5R to each other.

Figure 3:
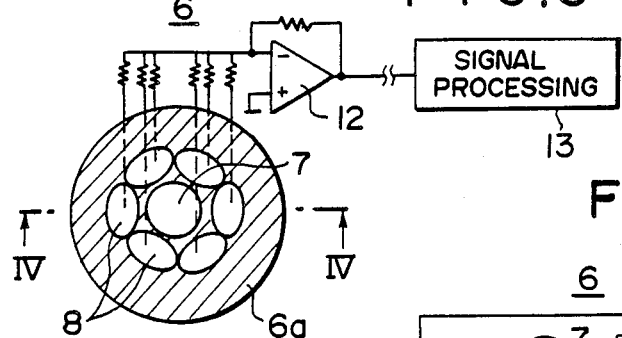
FIG. 3 is a schematic plan view showing the readout device used in the embodiment of FIG. 1.
Figure 4:
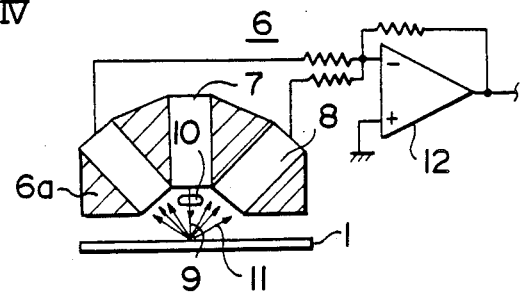
FIG. 4 is a sectional view taken along line IV-IV of FIG. 3.

The moveable member 4 is provided with a read-out device 6 as shown in detail in FIGS. 3 and 4. The read-out device 6 comprises a molded body 6a, a light beam generator (light emitting means) 7 such as a semiconductor laser or a light emitting diode, and light receiving elements (light detecting means) 8 such as phototransistors or photomultipliers positioned around the light beam generator 7. By way of example, six light receiving elements 8 are positioned in FIG. 3. As shown in FIG. 4, stimulating rays 9 emitted by the light beam generator 7 are converged by a condensing lens 10 and are made to impinge upon the stimulable phosphor sheet 1. As the stimulable phosphor sheet 1 is exposed to the stimulating rays 9, the exposed portion emits light 11 in proportion to the stored radiation energy. The emitted light 11 is detected by the light receiving elements 8 which output electric signals of levels corresponding to the intensity of the detected light. The electric signals are summed and amplified by an amplifier 12 and sent to a signal processing circuit 13.

As shown in FIG. 1, the rotatable member 4 is rotated at a velocity V in the direction as indicated by the arrow A, i.e. clockwise as viewed from above the apparatus. The velocity is adjusted so that a velocity component V1 in the sub-scanning direction is equal to the velocity v of scanning in the sub-scanning direction [$\sin \theta = V1/V$, $\tan \theta = (R-r)/L$]. Therefore, the stimulable phosphor sheet 1 is scanned by the stimulating rays 9, which are emitted by the light beam generator 7 of the read-out device 6, in a main scanning direction which is normal to the sub-scanning direction. Thus the stimulable phosphor sheet 1 is two-dimensionally scanned by simultaneously carrying out scanning in the main scanning direction and in the sub-scanning direction. The light 11 emitted by the stimulable phosphor sheet 1 upon stimulation by the stimulating rays 9 is detected by the light receiving elements 8, and the output signal of the amplifier 12 is processed by the signal processing circuit 13. In this manner, the image stored in the stimulable phosphor sheet 1 is read out. The electric signal processed by the signal processing circuit 13 is used to reproduce a visible image on a cathode ray tube or on a photographic material as a hard copy, or is stored in a magnetic tape.

In the above-mentioned embodiment, the single read-out device 6 is provided, and scanning in the main scanning direction is conducted when the read-out device 6 passes over the straight line portion 5a of the rotation path member 5. However, it is also possible to provide the apparatus with two read-out devices 6, and to conduct scanning in the main scanning direction also at the straight line portion 5b simultaneously with the scanning in the main scanning direction at the straight line portion 5a so that spaces between scanning lines scanned by one of the two read-out devices 6 are filled with the scanning lines scanned by the other read-out device 6. In this case, it becomes possible to improve the scanning speed. It is also possible to position many read-out devices 6 close to each other, and to simultaneously move the read-out devices 6 in slightly spaced relation to each other at the straight line portion 5a or 5b, thereby further improving the scanning speed.

In the aforesaid embodiment, since many light receiving elements 8 are positioned around the light beam generator 7, the light path length from the emission of the stimulating rays 9 to the detection of the light 11 emitted by the stimulable phosphor sheet 1 becomes short. Also, since the outputs of many light receiving elements 8 are summed and amplified, the light detection sensitivity becomes markedly high. Further, since the light receiving elements 8 are inclined inwardly toward the light beam generator 7, the angle at which the light receiving elements 8 cover the light 11 emitted by the stimulable phosphor sheet 1 becomes large.

Though the aforesaid embodiment is designed for image read-out and the light emitting means and the light detecting means are mounted on the moveable member 4, the image scanning apparatus of the present invention can also be designed as an image recording apparatus by mounting only the light emitting means on the endlessly moveable member. Further, when the apparatus is fabricated as an image read-out apparatus, it is also possible to provide the endless moveable member only with the light detecting means and to position the light emitting means independently.

Further, instead of constituting the endlessly moveable member for supporting the light emitting means and/or the light detecting means by the linear induction motor as described above, it is also possible to use an endless belt or the like. Of course, the image scanning apparatus of the present invention can be applied not only to stimulable phosphor sheets as described above but also to other recording materials.

I claim:

1. An image scanning apparatus comprising:
   (i) a recording material supporting means for supporting a recording material in a straightly moveable manner,
   (ii) an endlessly moveable member positioned close to said recording material supported on said supporting means for movement in a plane parallel to said recording material along straight lines parallel to said recording material and at an oblique angle with respect to the movement direction of said recording material,
   (iii) a main-scanning feed means for rotating said endlessly moveable member,
   (iv) at least one of a light detecting means and a light emitting means supported on said endlessly moveable member, and
   (v) a sub-scanning feed means for moving said recording material supporting means at a velocity approximately equal to the velocity component of said endlessly moveable member in the movement direction of said recording material, wherein said main-scanning feed means comprises a rotation path member such that said rotation path member and said endlessly moveable member respectively constitute a primary iron core and a secondary conductor plate of a linear induction motor with said recording material intervening therebetween.

2. An image scanning apparatus comprising:
   (i) a recording material supporting means or supporting a recording material in a straightly moveable manner,
   (ii) an endlessly moveable member positioned close to said recording material supported on said supporting means for movement along straight lines parallel to said recording material and at an oblique angle with respect to the movement direction of said recording material,
   (iii) a main-scanning feed means for rotating said endlessly moveable member,
   (iv) at least one of a light detecting means and a light emitting means supported on said endlessly moveable member, and (v) a sub-scanning feed means for moving said recording material supporting means at a velocity approximately equal to the velocity component of said endlessly moveable member in the movement direction of said recording material, wherein said main-scanning feed means comprises a rotation path member such that said rotation path member and said endlessly moveable member respectively constitute a primary iron core and a secondary conductor plate of a linear induction motor with said recording material intervening therebetween.

3. An image scanning apparatus comprising:
(i) a recording material supporting means for supporting a recording material in a straighly moveable manner,
(ii) an endlessly moveable member positioned close to said recording material supported on said supporting means for movement along straight lines parallel to said recording material and at an oblique angle with respect to the movement direction of said recording material,
(iii) a main-scanning feed means for rotating said endlessly moveable member,
(iv) at least two light detecting means and light emitting means spaced apart and supported on said endlessly moveable member at predetermined positions with respect to each other, and
(v) a sub-scanning feed means for moving said recording material supporting means at a velocity approximately equal to the velocity component of said endlessly moveable member in the movement direction of said recording material, whereby each of the light detecting means and light emitting means forms a scanning line on said recording material when said endlessly moveable member via said main-scanning feed means and said sub-scanning feed means are driven and, wherein the positioning of said two light detecting and light emitting means is such that one of said light detecting means and light emitting means scan said recording material in a first main-scanning direction simultaneously with the other one of said light detecting means and light emitting means scanning said recording material in a second main scanning direction generally opposite said first main-scanning direction.

4. An apparatus as defined in claim 3 wherein the spaced apart positions are such that the spaces between sequential scan lines of said one light detecting means and light emitting means are filled by the sequential scan lines of said other light detecting means and light emitting means.

* * * * *